United States Patent Office 3,170,335
Patented Feb. 23, 1965

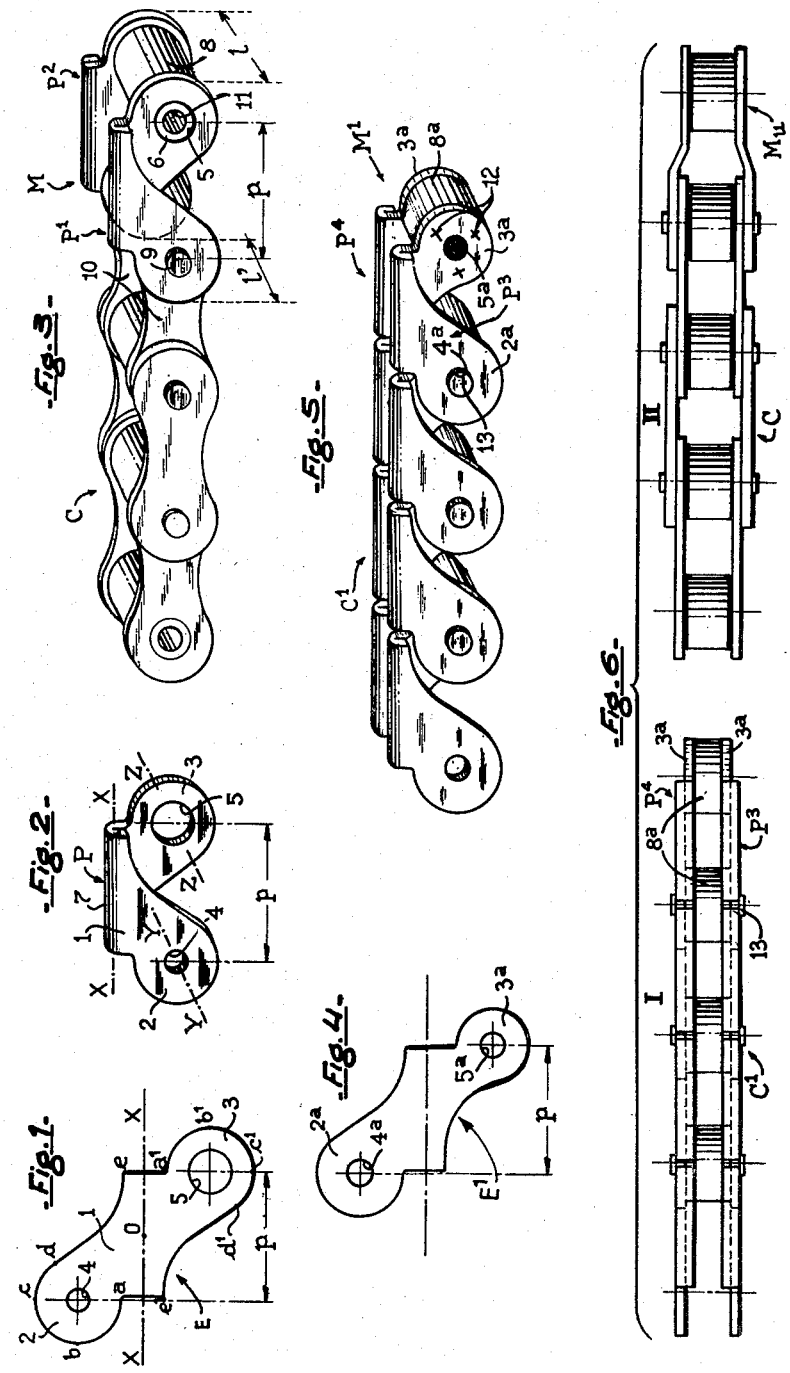

3,170,335
LINK PLATE CHAIN CONSTRUCTION
Paul Louis Emile Kuntzmann, Villejuif, France, assignor to Compagnie des Transmissions Mecaniques Seine-Doubs-Isere, Levallois-Perret, France, a corporation of France
Filed Jan. 13, 1964, Ser. No. 337,462
Claims priority, application France, Jan. 17, 1963, 921,702, Patent 1,356,967
3 Claims. (Cl. 74—250)

The present invention relates to power transmitting chains.

It is known that these chains are usually composed of inner link elements and outer links elements in alternating relation. The inner link elements usually comprise two inner plates interconnected by two hollow cylindrical spacer members or bushings which are an interference fit in the plates and on which are freely rotatable two cylindrical members, namely the rollers. The outer link elements also comprise two outer plates interconnected by two pins which extend through the bushing and are an interference fit in the outer plates.

Consequently, a chain thus constructed can only comprise an even number of link elements if its ends are interconnected to form an endless chain. If for any reason it is necessary to provide an odd number of link elements in the chain, a special link element is employed, namely a cranked link element which has one end similar to an inner link element and the other similar to an outer link element. Such a link element comprises two cranked plates interconnected in the same way as an inner link element by a hollow cylindrical bushing on which the roller is freely rotatable. The two cranked plates are also interconnected by a pin at their other ends in the manner of an outer link element. Note that some special chains for reasons of convenience consist solely of successive cranked link elements.

It will be understood that owing to their very shape the cranked plates have a certain elasticity and become deformed when a force is applied thereto in the longitudinal direction. The elastic deformation increases the pitch of the link element and this has a serious drawback when the chain engages the driving or driven sprocket.

It is an object of the invention to provide a cranked plate for a chain comprising a metal blank which is so shaped as to have a rectangular central portion and two tabs which are symmetrical relative to the center of said portion, an aperture being provided in each tab, the distance between the two apertures in the direction parallel with the major axis of the central portion being equal to the required pitch $p$ for the chain, and said blank being folded on said major axis in such manner that, after folding, the two tabs of the blank are in adjoining relation to each other and are consequently offset relative to each other a distance roughly corresponding to the thickness of the metal of the blank, the axes of the two apertures being parallel with each other and orthogonal to the fold line.

Another object of the invention is to provide a cranked link element whose plates are of the type defined hereinbefore and are interconnected by conventional members, namely bushings and pins.

Such a link element can be disposed at one end of a conventional chain, but another object of the invention is to provide a chain which is composed entirely of the cranked plates of the type defined hereinbefore which are interconnected, as concerns the inner link end, by welding on a spacer washer which performs the function of a fixed roller for engaging the sprockets and interconnected, as concerns the outer link end, by a pin which extends through the bore formed in the plates and the welded washer and pertains to the immediately preceding or following link element in the chain.

Further features and advantages of the invention will be apparent from the ensuing description, with reference to the accompanying drawings to which the invention is in no way limited.

In the drawings:

FIG. 1 is an elevational view of a blank intended to provide, after folding, the cranked plate according to the invention;

FIG. 2 is a perspective view of said cranked plate;

FIG. 3 is a perspective view of a portion of a conventional chain, one end of which is provided with a cranked link element obtained from two cranked plates;

FIG. 4 is an elevational view of a variant of a blank adapted to form part of a chain entirely composed of cranked link elements according to the invention;

FIG. 5 is a perspective view of a portion of said chain, and

FIG. 6 is a plan view showing, at I, a portion of the chain shown in FIG. 5, and, at II, a portion of a conventional chain having a conventional end link element.

To manufacture a cranked plate according to the invention, a blank E of metal is formed in the shape roughly shown in FIG. 1. This blank comprises a central portion 1 having a rectangular shape $a$, $e$, $a^1$, $e^1$, a major axis X—X, and on each side of this portion, two tabs 2 and 3.

The length of the central portion is roughly equal to the pitch $p$ of the link element to be constructed. The width of the central portion is small, for example of the order of ⅓ of the pitch $p$.

The lateral tabs 2, 3 are symmetrical relative to the center 0 of the rectangular portion 1 and are consequently offset toward the opposite ends of this portion. Each tab is connected to the corner $a$ or $a^1$ of this portion by a semicircular edge $a$, $b$, $c$ or $a^1$, $b^1$, $c^1$ and to the other corner $e$ or $e^1$ by a curved edge having a convex portion $c$, $d$ or $c^1$, $d^1$ which extends the circular edge $a$, $b$, $c$ or $a^1$, $b^1$, $c^1$, and a circular concave portion $d$, $e$ or $d^1$, $e^1$.

This blank is provided with two apertures 4 and 5 of different diameters, the aperture 5 being larger than the aperture 4 and the centers of these apertures being at an equal distance from the axis X—X and being spaced apart in a direction parallel with the axis X—X a distance equal to said desired pitch $p$ of the chain. Thereafter, the blank is folded along the axis X—X so that the axes Y—Y and Z—Z of the apertures 4 and 5 are parallel with one another and orthogonal to the axis X—X.

FIG. 2 shows a finished plate P. The plane containing the axes Y—Y and Z—Z is parallel with the axis X—X of the fold and with the back 7 of the cranked plate.

It will be observed that if two forces in opposite directions are applied on each of the apertures 4 and 5 of the plate P, the latter will, owing to its particular shape, have no tendency to undergo an elastic deformation since this plate is stiffened in the longitudinal direction by the fold which prevents it from becoming deformed, and thereby the pitch $p$ of the link element remains exactly constant.

Thus, it is clear from FIG. 3 that if two plates $P^1P^2$ according to the invention are taken, the plate P¹ being folded to the left and the plate P² to the right, and these plates are interconnected by a bushing 6 which is an interference fit in the large aperture 5 of each plate and on which is freely rotative a roller 8, a cranked link element M is formed which has an outside width $l$ adjacent the bushing and roller which is slightly less than the inside width $l'$ at the other end of the link element. The suitable spacing between the plates P¹ and P² is insured by the interference fit of the bushing 6 in these plates.

Such a link element M can be pivotally mounted by a pin 9, on the inner link element 10 of a conventional chain C and, by the bore 11 of its bushing 6, on the outer plates of another link element (not shown). The cranked link element M engages the driving and driven sprockets (not shown) through the medium of the roller 8 in the same manner as the conventional link elements of the chain C.

The plate according to the invention permits constructing the chain C¹ of an entirely new conception as shown in FIG. 5 and at I in FIG. 6. Each link element of this chain is formed by two plates P³ and P⁴ according to the invention, one being folded to the left and the other to the right. These plates, which are obtained by folding blanks E¹ (FIG. 4), are cut from low carbon case hardened steel whose composition by weight is for example the following:

$$C = 0.10-0.18$$
$$Si = 0.20-0.40$$
$$Mn = 0.35-0.70$$
$$S \text{ and } P \leq 0.035$$

One of the tabs 2ᵃ of the blank has a diameter distinctly greater than the other tab 3ᵃ. The two plates are held the appropriate distance apart by a cylindrical washer 8ᵃ having the same diameter as the tabs 3ᵃ. This washer is composed of the same metal as the plates and is secured to the plates as for example by being spot welded at 12 (FIG. 5) to the two tabs 3ᵃ of the plates.

As in the first embodiment, it will be observed that the outside width of such a link element M¹ at the end corresponding to the tabs 3ᵃ is slightly less than the inside width of the link element at the end corresponding to the tabs 2ᵃ. Consequently, identical link elements can engage one another if the tabs 3ᵃ and the washer 8ᵃ are provided with an aperture 5ᵃ having a diameter slightly larger than the diameter of the aperture 4ᵃ formed in the tabs 2ᵃ. A pin 13 composed of the same material as the plates can be inserted with an interference fit in the apertures 4ᵃ. This pin is slidable with clearance in the aperture 5ᵃ and constitutes a pivotal connection. The engagement of the chain on the driving and driven sprockets (not shown) occurs in exactly the same manner as that of the conventional chain C comprising a conventional cranked link element $M_u$ through the medium of the cylindrical parts constituted by the two tabs 3ᵃ which are rigid with the washer 8ᵃ owing to the welding.

To prevent wear from occurring, as all the parts are composed of the aforementioned steel or the like, a hardening treatment is carried out on this steel in accordance with conventional processes, such as case-hardening, cyaniding, nitriding followed by quenching in an appropriate quenching fluid.

Although specific embodiments of the invention have been described, many modifications and changes may be made therein without departing from the scope of the invention as defined in the appended claims.

Having now described my invention what I claim as new and desire to secure by Letters Patent is:

1. A cranked plate having a given thickness for a transmission chain link element, the plate comprising a first portion and a second portion contained in two planes which are parallel with each other and spaced apart an extent slightly greater than said thickness of the plate, a third portion interconnecting the first and second portions and having an axis along which the third portion is folded, the first portion and second portion each having an aperture, the axes of the apertures being parallel with each other and orthogonal with said axis of the third portion, the plate being so shaped that if said three portions are laid flat in a single plane they form a metal blank comprising a rectangular central portion corresponding to said third portion, the first and second portions being symmetrically disposed relative to the central portion, and the distance between the apertures in a direction parallel with said axis of the third portion being equal to the desired pitch of the transmission chain for which the link element is intended.

2. A cranked link element for a transmission chain, the link element comprising two cranked plates, each cranked plate having a given thickness and comprising a first portion and a second portion contained in two planes which are parallel with each other and spaced apart an extent slightly greater than said thickness of the plate, a third portion interconnecting the first and second portion and having an axis along which the third portion is folded, the first portion and second portion each having an aperture, the axes of the apertures being parallel with each other and orthogonal with said axis of the third portion, the plate being so shaped that if said three portions are laid flat in a single plane they form a metal blank comprising a rectangular central portion corresponding to said third portion, the first and second portions being symmetrically disposed relative to the central portion, and the distance between the apertures in a direction parallel with said axis of the third portion being equal to the desired pitch of the transmission chain for which the link element is intended; the plates being so folded about the corresponding axis of the third portion and so disposed relative to each other that the first portions of the plates are outwardly offset from the second portions of the plates, a bushing mounted with an interference fit in the apertures of the second portions and holding one end of the cranked link element assembled, a pin mounted with an interference fit in the apertures of the first portions and holding the other end of the cranked link element assembled, the diameter of the pin being such that the pin is a slide fit in the bushing of the link element immediately adjacent the cranked link element in the chain for which the cranked link element is intended, and a roller rotatably mounted on the bushing.

3. A transmission chain comprising an assembly of cranked link elements, each link element having two cranked plates, each cranked plate having a given thickness and comprising a first portion and a second portion contained in two planes which are parallel with each other and spaced apart an extent slightly greater than said thickness of the plate, a third portion interconnecting the first and second portions and having an axis along which the third portion is folded, the first portion and second portion each having an aperture, the axes of the apertures being parallel with each other and orthogonal with said axis of the third portion, the plate being so shaped that if said three portions are laid flat in a single plane they form a metal blank comprising a rectangular central portion corresponding to said third portion, the first and second portions being symmetrically disposed relative to the central portion, and the distance between the apertures in a direction parallel with said axis of the third portion being equal to the desired pitch of the transmission chain for which the link element is intended; the plates being so folded about the corresponding axis of the third portion and so disposed relative to each other that the first portions of the plates are outwardly offset from the second portions of the plates, a pin mounted with an interference fit in the apertures of the first portions and holding the first portions the desired distance apart, a cylindrical washer composed of the same metal as the plates and interposed between the second portions and secured to the second portions so as to hold the second portions the desired distance part, the washer having a central aperture which is coaxial with the apertures of the second portions so that the assembly consisting of the washer and second portions has a transverse bore in which the pin of the immediately adjacent link element in the transmission chain is a slide fit, the second portions having a curved contour in said plane of the second portions, the radius of said contour being indentical to the outside radius of the washer, whereby the transmission chain engages the sprockets for which it is intended through the medium of a cylindrical face constituted by the washer and the second portions.

References Cited by the Examiner

UNITED STATES PATENTS

| | | | |
|---|---|---|---|
| 619,888 | 2/99 | Higgins | 74—250 X |
| 1,031,499 | 7/12 | Wilkin. | |

FOREIGN PATENTS 1,246,939  10/60  France.

DON A. WAITE, *Primary Examiner.*